United States Patent Office.

CARL HERING, OF PHILADELPHIA, PENNSYLVANIA.

SECONDARY BATTERY.

SPECIFICATION forming part of Letters Patent No. 372,468, dated November 1, 1887.

Application filed January 26, 1887. Serial No. 225,582. (No model.)

*To all whom it may concern:*

Be it known that I, CARL HERING, a citizen of the United States, residing at Philadelphia, in the county of Philadelphia and State of Pennsylvania, have invented new and useful Improvements in Secondary Batteries, of which the following is a specification.

My invention relates to the preparation of the active material for secondary batteries prior to its being electrically formed.

It is well known in the arts that the active material, usually consisting of some of the lead oxides, is applied while in a plastic state to a frame or grid, and when dry and hard it is immersed in the acid and formed electrically.

The difficulty experienced in doing this is that when this dry mass is immersed in the liquid the active material rapidly absorbs the liquid, thereby being disintegrated and loosened from its retaining cells or plates, often falling off, especially when the charging-current evolves gases on the plate, which tend to loosen the active material.

The object of the first part of my invention is to prevent this disintegration and falling off of the active material, thereby also permitting the use of a strong forming-current, by which much time may be saved. I am thereby also enabled to make a homogeneous conductive plate consisting entirely of active material, which, when formed into peroxide, is a hard self-sustaining plate, free from the usual objectionable local action with the otherwise indispensable lead supporting-frame.

A lead salt or compound which is soluble in water, and is therefore termed a "soluble" salt or compound, is insoluble in sulphuric acid, or in water containing considerable sulphuric acid, which can be shown by putting a crystal of the soluble nitrate of lead into diluted sulphuric acid. Such soluble salts or compounds may therefore, when dissolved and then evaporated to dryness, be used as binding material for the oxide or other material to be used for the plates, as it will not dissolve in the sulphuric-acid solution in which the plate is to be formed. Being a lead compound, it will also ultimately be formed into lead peroxide or metallic lead.

In my invention I mix the dry oxide with a solution of a lead salt or compound—such, for instance, as lead nitrate or sodium plumbate—until the whole forms a plastic mass. This mass is then applied to the grid or plate, or if it is to be made into a solid homogeneous mass—such as a plate, rod, or cylinder—it is pressed into a suitable mold. When quite dry, it forms a hard mass of about the consistency of hard chalk. On immersing it into the sulphuric acid for charging, it will retain its coherency and have no tendency to disintegrate or fall to pieces. When used for the cathode or spongy lead plate, it will even adhere strongly to the flat surface of a sheet of lead. The oxide of lead is mixed with a soluble salt or compound of lead, so as to form a plastic mass. This is then dried. The soluble salt crystallizes out during the process of drying, forming a hard mass, including the oxide. This, during the process of forming in sulphuric acid, is not redissolved, as it is well known that crystals of soluble salts of lead, are not soluble in sulphuric acid.

The advantages gained hereby are that, as there is no essential chemical action requiring time, the plastic masses may be dried quickly, as in an oven, thus saving much time. The forming-current may be quite strong, thus reducing the time of forming. The active material is not so likely to fall out of the recesses or cells while the battery is in use. Hard conducting homogeneous and self-sustaining anodes or peroxide plates, disks, or cylinders may thereby readily be made of any shape or form, and having any desired kind of surface. Masses so prepared and formed have a remarkable degree of hardness and strength when oxidized to peroxide, at the same time having the necessary porosity.

It is evident that instead of the soluble salt or compound of lead I may use such acid, alkali, or compound—as, for instance, sodium hydrate—which, together with the lead oxide will form a soluble salt or compound of lead; also, that I may mix any of these soluble compounds of lead together before adding them to the oxide, or while doing so. I prefer to add some peroxide to the lower oxides of lead usually used, as it diminishes the time required to form the active material.

It is an especial feature of my invention that the salts used with the lead oxides shall be highly soluble, and I disclaim the use in this connection of any salt which is not freely soluble.

I am aware that chloride of lead—a slightly-soluble salt—has been mixed with lead oxide in the construction of secondary-battery electrodes. In this construction, however, the chloride of lead is not readily soluble.

I disclaim, therefore, the use of the salt chloride of lead when used with lead oxide.

The second part of my invention relates to the process of making the active material porous. I do this by adding to the active material when in a plastic state a chemically inert soluble substance—such, for instance, as sugar—which, after the mass has hardened and set, may be dissolved out, leaving the mass porous.

I claim—

1. Material to become active for use in a storage-battery, consisting of lead oxide and any highly soluble salt or compound of lead, as nitrate of lead or its equivalent, substantially as described.

2. As a new article of manufacture, a secondary-battery electrode consisting of an oxide, salt, or compound of lead, with an acid, alkali, or salt, such as nitric acid or sodium hydrate, which when united forms a highly soluble salt or compound of lead, substantially as described.

3. As a new article of manufacture, a secondary-battery electrode consisting of a mixture of lead oxide and a soluble salt, as nitrate of lead or its equivalent, with a soluble substance, as sugar, the whole being adapted to form an electrode ready for use on forming and dissolving out the soluble substance, substantially as described.

CARL HERING.

Witnesses:
E. HILTEBRAND,
ALFRED RIGLING.